United States Patent [19]

Laramie

[11] Patent Number: 5,120,072
[45] Date of Patent: Jun. 9, 1992

[54] HAND TRUCK FOR TRANSPORTING LONGITUDINAL OBJECTS

[76] Inventor: Leon Laramie, P.O. Box 3493, Redwood City, Calif. 94064

[21] Appl. No.: 644,023

[22] Filed: Jan. 22, 1991

[51] Int. Cl.⁵ .............................................. B62B 3/10
[52] U.S. Cl. .................................. 280/47.17; 280/79.7
[58] Field of Search ............... 280/47.131, 47.17, 47.2, 280/79.11, 79.7, 755, 47.16, 47.3, 47.34, 47.24, 79.3; 294/15, 26

[56] References Cited

U.S. PATENT DOCUMENTS

| | | | |
|---|---|---|---|
| 2,514,308 | 7/1950 | Burg | 280/79.7 |
| 3,090,635 | 5/1963 | Masterson, Jr. | 280/79.7 |
| 3,580,601 | 5/1971 | Miles | 280/79.7 |
| 4,155,527 | 5/1979 | Sjoberg | 280/47.2 |
| 4,488,733 | 12/1984 | Hellsten | 280/79.7 |
| 4,630,838 | 12/1986 | Stockton | 280/47.17 |

*Primary Examiner*—Andres Kashnikow
*Assistant Examiner*—Richard Camby

[57] ABSTRACT

A hand truck or dolly for transporting longitudinal objects such as plasterboard, doors, panels, mattresses, or the like. The hand truck has a longitudinal base (10) installed at least on a three wheels arranged in line along the longitudinal axis of base 10. At least two of these wheels (94, 96) have axes of rotation fixed with respect to the base, while at least one wheel (98) is a swivel wheel, the axis of which can be turned in a horizontal plane with respect to the base. A vertical frame (27) is formed of stands (14 and 16) and side braces (19 and 21) and is rigidly attached to one side of the frame, while its other side has a short shoulder 12 for protecting an object (102) being transported from sliding and falling from the hand truck. A distinguishing feature of the hand truck is a kickstand (28) which allows one to place the truck in a self-supporting substantially vertical position. In a ground-supporting position, the kickstand is fixed by a a locking arm (34), while in a folded position it is locked to the frame by a U-shaped yoke 54. A tiedown strap (82) can be used for stabilizing the object on the hand truck. The strap has hooks (86 and 87) on its both ends. The strap is wrapped around the object, then one hook is put onto crossbar (22) of the frame, while the other is locked by inserting into one of the holes (88, 90, 92) formed in the shoulder.

18 Claims, 3 Drawing Sheets

HAND TRUCK FOR TRANSPORTING LONGITUDINAL OBJECTS

FIELD OF THE INVENTION

The present invention relates to hand trucks, particularly to hand trucks for transporting longitudinal objects such as panels, plasterboard, doors, mattresses, glass, etc.

BACKGROUND—DESCRIPTION OF PRIOR ART

At the present time there is a great variety of various hand trucks, dollies, and wheeled carriers which can be selected for transporting heavy longitudinal objects such as panels, mattresses, doors, etc.

One such device (U.S. Pat. No. 3,090,635 to M. Masterson, 1963) comprises an elongated bed for supporting an object to be transported, and a pair of wheels journalled on a common axis. In other words, the wheels are parallel to each other with the load being located between the wheels. A disadvantage of this device is that it does not have any means for fixing the load during transportation and the operator has to manually support the load while pushing the device in the required direction.

Another hand truck (U.S. Pat. No. 4,695,067 to R. Willey, 1987). for transporting longitudinal objects contains a wheeled axle with parallel wheels installed on the ends of the axle, a load-supporting platform located between the wheels, and a spring-loaded clamping mechanism for clamping the load in the course of transportation. This truck requires a space between the wheels and cannot be made narrow.

Many other conventional wheeled hand trucks for transporting longitudinal objects are known, but they all have at least two parallel wheels installed on a common axis. In other words, such hand trucks always require a space between their wheels and therefore cannot be made very narrow. For this reason, conventional hand trucks cannot be used in very narrow spaces.

In case the hand truck is a two-wheeled device, it has no self-supporting means and therefore requires that the operator support the truck during loading, unloading, and transportation.

In other words, existing hand trucks for loading, unloading and transporting longitudinal objects are inconvenient in use, require extra space in storage, and must be supported by the operator in use.

OBJECTS AND ADVANTAGES OF THE INVENTION

It is therefore an object of the present invention to provide a hand truck for transporting longitudinal objects which occupies a very limited space and possesses self-supporting features. Other advantages and features of the invention will become apparent from a consideration of the ensuing description and drawings.

REFERENCE NUMERALS USED IN THE SPECIFICATION AND DRAWINGS

Figure 1:
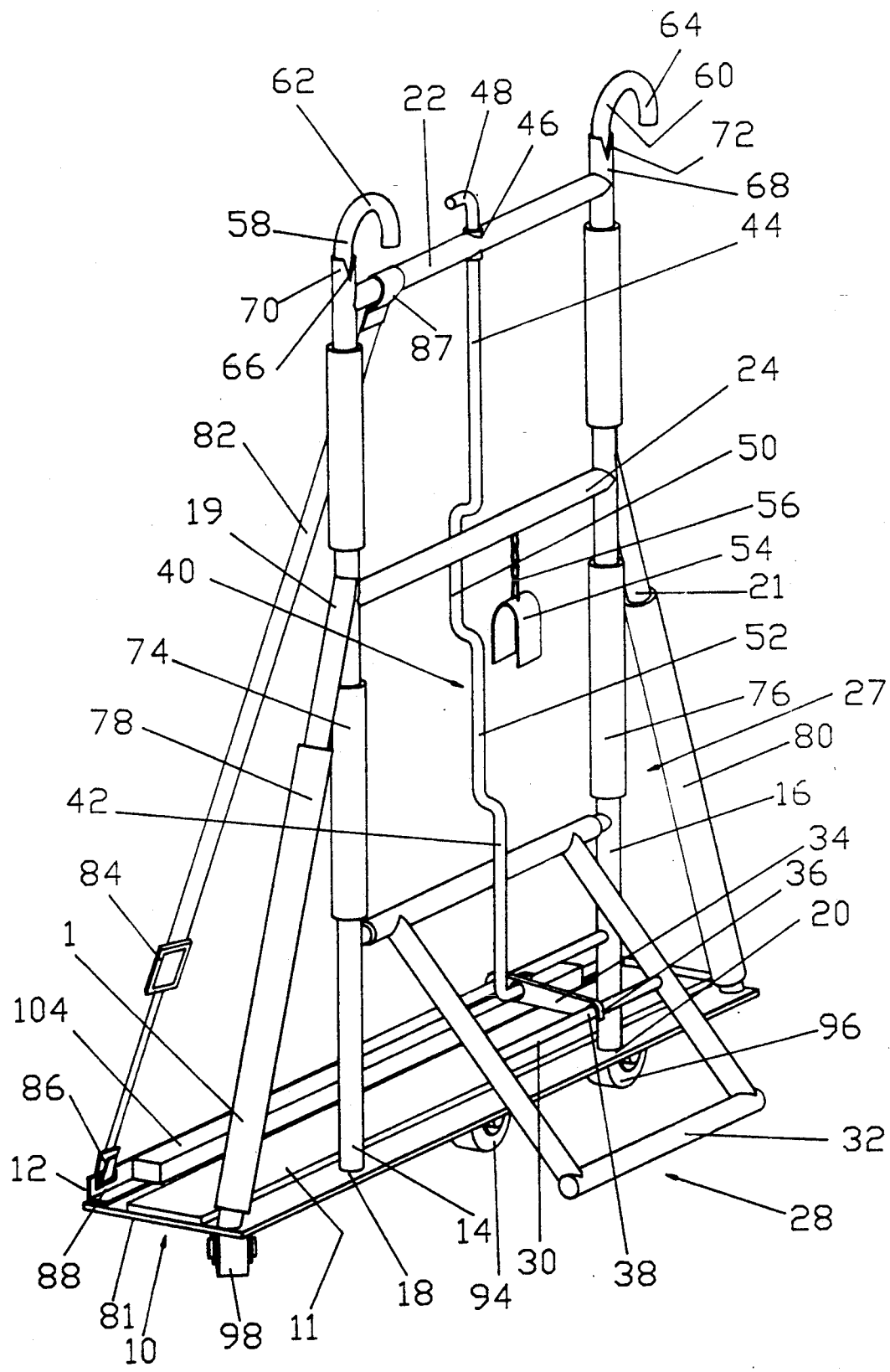
FIG. 1 is a perspective view of a hand truck of the present invention for transporting longitudinal objects.

10—base
11—upper side of the base
12—shoulder
13—bottom side of the base
14 and 16—vertical stands
18 and 20—weld seams
19 and 21—side braces
22, 24, and 26—cross bars
27—rigid vertical frame
28—kickstand
30—intermediate crossbar
32—outer bar
34—locking arm
36—clamp
38—slot
40—control rod
42—lower end of control rod
44—upper end of control rod
46—hole
48—handle
50 and 52—arched-shaped curved portions
54—U-shaped yoke
56—chain
58 and 60—rods
62 and 64—cargo hooks
66 and 68—triangular grooves
70 and 72—protruding portions
74, 76, 78, 80, and 81—rubber pads
82—strap
84—tiedown quick-release buckle
86, 87—strap hook
88, 90, and 92—receiving holes
94, 96—wheels with fixed axles
98—swivel wheel
100—ground
102—cargo
104—spacer block
L-L—plane which passes through all wheels
α-angle of inclination of the frame to the vertical direction in a self-supporting position of the hand truck

FIGS. 1 TO 3—DESCRIPTION OF A HAND TRUCK OF THE INVENTION

Figure 2:
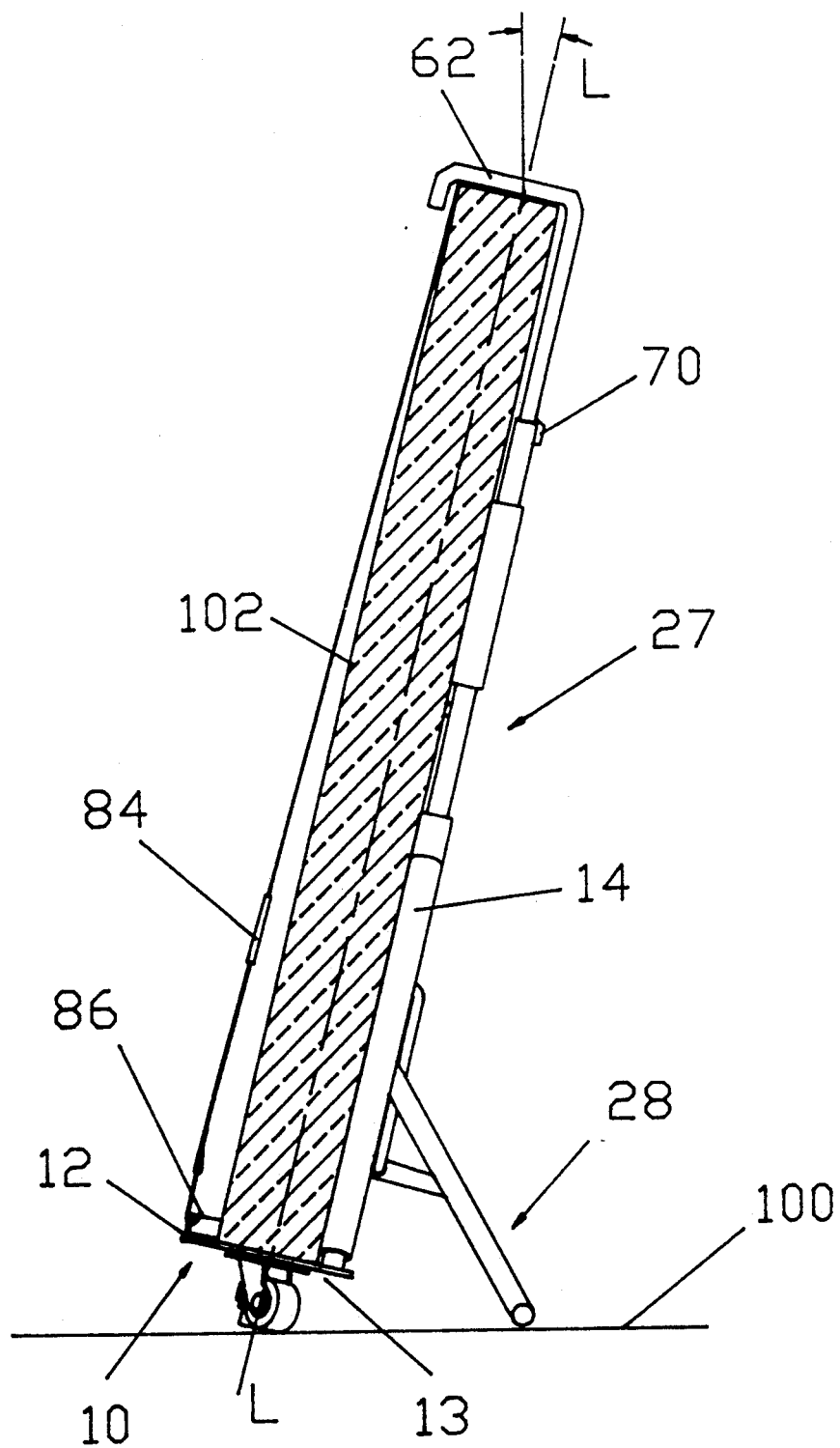
FIG. 2 is an end view of the hand truck of FIG. 1 in a self-position with a longitudinal object on it.
Figure 3:
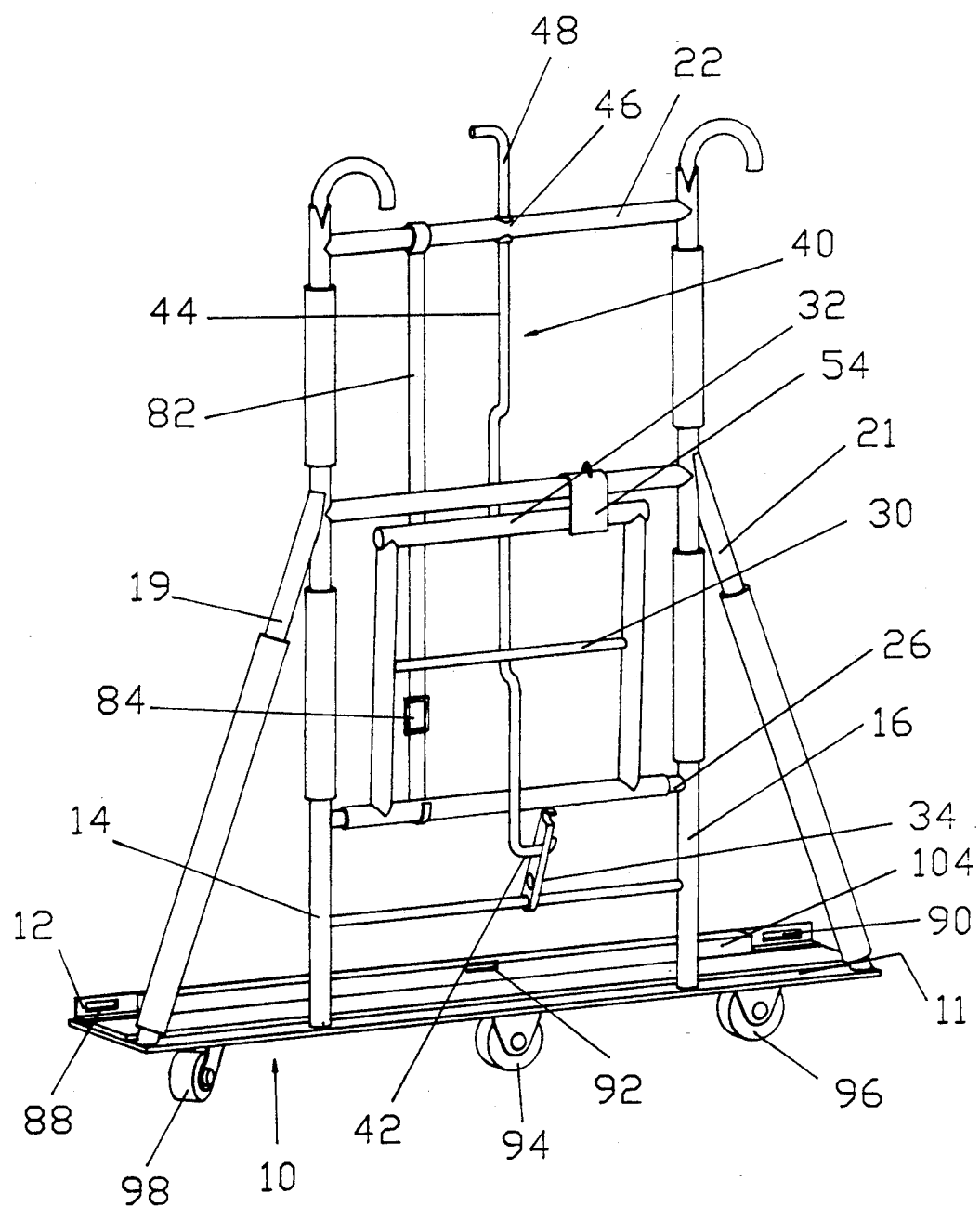
FIG. 3 is a perspective view of the hand truck of FIG. 1 with a kickstand in a folded position.

An example of a hand truck of the invention for loading longitudinal objects such as panels, plasterboard, doors, mattresses, etc. is shown in FIGS. 1 to 3.

The hand truck has a base 10 which is made in the form of a flat longitudinal platform convenient for supporting loads to be transported. Base has an upper side 11 and a bottom side 13 (FIG. 2). On its upper side 11 (FIG. 1) base 10 has a shoulder 12 (FIGS. 1 and 2) which is used as a stop for the load and protects it from sliding and falling down. On its bottom side 13 (FIG. 2), base 10 has vertical support members, namely a pair of vertical stands 14 and 16 (FIGS. 1 and 2). These stands comprise pipe sections which are attached to base 10, e.g., by welds 18 and 20 (FIG. 1).

Stands 14 and 16 are additionally connected to base 10 by stabilizing side braces 19 and 21. These braces preferably are connected to base 10 and to stands 14 an 16 by weld seams (not shown).

Stands 14 and 16 are interconnected by three parallel crossbars 22, 24, and 26. Thus stands 14 and 16, side braces 19 and 21, and crossbars 22, 24, and 26 form a rigid vertical frame 27 of the hand truck. Crossbar 24 pivotally supports an auxiliary ground support means, namely a kickstand 28 for installing the hand truck in a self-supporting substantially vertical position. The latter is made of rods or pipes in the form of a rectangular frame which has an intermediate crossbar 30 and an outer bar 32. The surface of bar 32 can be coated with a material with high coefficient of friction, e.g., rubber. The length of kickstand 28 between bars 32 and 24 is shorter than the distance between bars 24 and 22.

Bar 26 pivotally supports a locking arm 34 which has on its free end a hook-like clamp 36 with a slot 38 which is engageable with bar 30 of kickstand 28, so that when bar 30 is inserted into slot 38, the kickstand is locked against movement.

A control rod 40 is pivotally connected at its lower end 42 to an intermediate portion of locking arm 34. Control rod 40 is arranged vertically and extends in the upward direction so that its upper end 44 passes through a hole 46 formed in bar 22. On its extreme upper end which projects above bar 22, control rod 40 has an angular handle 48 which facilitates manipulation with control rod 40.

Control rod 40 has two arch-shaped curved portions 50 and 52 to accommodate cross bars 32 and 30, respectively, when kickstand 28 is turned up and is fixed in a folded position shown in FIG. 3.

As has been mentioned above, the length of kickstand 28 between bars 32 and 24 is shorter than the distance between bars 24 and 22. Therefore, as shown in FIG. 3, in the folded position of kickstand 28 its outer crossbar 32 will be located directly underneath the crossbar 22. In order to lock kickstand 28 in its folded position shown in FIG. 3, the hand truck has a U-shaped yoke connected to an element of frame 27, e.g., to bar 22 by means of a flexible link, such as a chain 56. For locking the kickstand in its folded position, yoke 54 is fitted over bars 22 and 32. Since bar 22 belongs to frame 27 and bar 32 belongs to the kickstand, yoke 54 connects kickstand 28 to frame 27 and thus locks it in a fixed position.

As has been mentioned above, stands 14 an 16 are made from sections of pipes and therefore are hollow. Slidingly inserted into hollow stands 14 and 16 are rods 58 and 60 which have cargo hooks 62 and 64, respectively, on their upper ends. Rods 58 and 60 can freely rotate in stands 14 and 16 and can be easily moved up for adjusting to the height of the cargo so that hooks 62 and 64 can be engaged with the upper edge of the longitudinal load to be transported.

In order to protect hooks 62 and 64 from rotation beyond the plane of frame 27 formed by stands 14 and 16 in the direction opposite to shoulder 12, the upper ends of stands 14 and 16 have shaped, e.g., triangular, grooves 66 and 68, while rods 58 and 60 have protruding portions 70 and 72 of the shape mating with the above-mentioned groove. Thus when portions 70 and 72 are inserted into grooves 66 and 68, hooks 62 and 64 are fixed against rotation. In order to ensure fixation of hooks 62 and 64 in several angular positions with respect to frame 27, several grooves can be circumferentially arranged on the ends of stands 14 and 16.

In order to protect the cargo from damage because of contact with stands 14 and 16 and side braces 19 and 21, their surfaces preferably are coated with a resilient material, such as rubber pads 74 and 76 and 78 and 80, respectively. A pad 81 preferably covers the entire surface of base 10.

To secure the cargo in place on hand truck during transportation, the truck has flexible stretchable straps 82. Although in the attached drawings straps 82 are shown in the form of tiedown straps with quick-release tiedown buckles, the same function can be fulfilled by a bungee cord, rope, or an expander, provided that such a flexible strap has a strap hook 86 on one end and a strap hook 87 on the other end. Hook 87 can be fitted onto crossbar 22 of frame 27, while hook 86 can be inserted into one of receiving holes 88, 90, and 92 which are formed in shoulder 12. Although three holes 88, 90, and 92 are shown in FIGS. 1 and 3, the number of those holes may exceed three or can be less than three. What is important is that at least one hole 90, which is located in the center of the length of shoulder 12, is available.

An important feature of the invention is arrangement of wheels on which the hand truck is supported. As shown in FIGS. 1 and 3, base 10 is supported by a pair of wheels 94 and 96 which rotate on fixed axles (not shown) and by a swivel wheel 98 which is installed on one of the base ends. The term "swivel wheel" denotes a wheel which has a diameter smaller than wheels 94 and 96 and which, in contrast to wheels 94 and 96, has fixed axes of rotation, has an axis of rotation (not shown) which can rotate in a vertical plane so that wheel 98 functions as a steering wheel. All three wheels 94, 96, and 98 are arranged in the same plane L-L (FIG. 3) which coincides with or parallel to the direction of the longitudinal axis of base 10 and, hence, of the hand truck. All parts of the hand truck can be made of a light aluminum alloy. Dimensions of the hand truck may vary depending on its specific purpose and operation conditions. In one concrete example the hand truck had the following overall dimensions: length 90 cm, width 18 cm, and height 90 cm. The hand truck weighed 8.2 kg.

FIG. 2 AND FIG. 3—OPERATION

Assume now that the hand truck is stored in the position shown in FIG. 3 with kickstand 28 folded and fixed by yoke 54.

In order to prepare the hand truck for loading and unloading cargo, the hand truck is put into the vertical self-supporting position shown in FIG. 2. For this purpose, the operator pulls yoke 54 up and removes it from bars 22 and 32, so that kickstand 28 can be turned down around bar 24 to a position in which it comes into contact with the floor or ground 100 along which the hand truck is moved. In order to fix kickstand 28 in a position which supports the hand truck with stands 14 and 16 inclined by about 10° with respect to the vertical plane, locking arm 34 is turned around bar 26 and clamp 36 is fit onto this bar so that it is received in slot 38, whereby arm 34 is locked with respect to truck frame 27. Now the hand truck will be firmly supported by kickstand 28, similar to a bicycle or a motorcycle at rest. In its self-supporting position, vertical frame 27 is slightly inclined at an angle α to the vertical. For ensuring stable position of the hand truck, angle α should be within the range of 0° to 10° to the vertical.

Now the operator can install a longitudinal load, which in the illustrated case is shown as a mattress 102 (FIG. 3). Load 102 is placed in an upright position onto padded base 10 leaning against padded surfaces of stands 14, 16 and braces 19 and 21. Since base 10 and surface of the stands and braces are padded with rubber pads 74, 76, 78, 80, and 81, load 102 cannot be damaged. In order to fix load 102 against movement in a transverse direction, a spacer, such as a wooden block 104, can be placed between the inner surface of shoulder 12 and the facing surface of load 102. The load is then fixed in place by cargo hooks 62 and 64 which can be adjusted vertically by sliding inside hollow tubular stands 14 and 16. Hooks 62 and 64 are embrace the upper edges of load 102 and then are fixed against rotation by inserting protruding potion 70 and 72 into triangular grooves 66 and 68.

Load 102 is finally fixed by wrapping it with strap 82 which is tightened by using quick-release buckle 84. A strap hook 86 is guided over cross bar 22 and hook 87 is inserted into one of holes 88, 90, or 92.

While supporting the loaded hand truck with one hand, the operator disengages locking arm 34 from bar 30 of kickstand 28, whereby the kickstand is freed. The operator now turns kickstand 28 up with the other hand or with a foot into the position shown in FIG. 3 and fixes the kickstand in the folded position by fitting yoke 54 onto bars 22 and 32. In the folded position of kickstand 28, its bars 32 and 30 are inserted into recesses of arch-shaped curved portions 50 and 52 of control rod 40 and therefore do not interfere with the element of frame 27.

Now the hand truck is ready for transportation.

After completion of the transportation operation, the hand truck can easily be placed in storage. The operator, using handle 48, pulls control rod 40 up, disconnects locking arm 34 from the intermediate crossbar, and thus releases kickstand 28 for turning it around crossbar 24 into a vertical position shown in FIG. 3. Kickstand 28 is locked in this position by fitting U-shaped yoke onto crossbars 22 and outer bar 32 of the kickstand, so that the kickbar appears to be locked in the above-mentioned vertical or folded position against further movement with respect to frame 27. Now the overall width dimension of the hand truck is determined only by the width of base 10.

SUMMARY, RAMIFICATIONS, AND SCOPE

Thus it has been shown that the invention provides a hand truck for transporting longitudinal objects which occupies a very limited space and possesses self-supporting features. It is light in weight, small in size, and easy to manipulate.

Although the invention has been shown and described in the form of the specific embodiment, this embodiment, its parts, materials, and configurations have been given only as examples, and that many other modifications of the hand truck for transporting longitudinal objects are possible. For example, vertical stands 14 and 16, side braces 19 and 21, as well as cross bars 22, 24, and 26 can be connected not by welding but by threaded fasteners. Base 10 can be supported by more than two wheels having fixed axles. The side braces can be replaced by triangular metal plates. There can be more vertical stands than two with more than two hooks. Straps 82 can be made in the form of resilient expandable cords with hooks at the ends. Shoulder 12 may have a plurality of uniformly or non-uniformly spaces holes for engagement with the above-mentioned hooks. A device other than U-shaped yoke 54 can be used for locking kickstand 28 in the folded position. It can be, e.g., a flexible band with a snapping connection, or the like. Locking arm can be pivotally attached to base 10 rather than to crossbar 26, which in that case can be eliminated. There can be several straps such as strap 82. The entire hand truck frame, including the base and stands, can be molded from a durable plastic. Therefore, the scope of the invention should be determined, not by the example given, but by the appended claims and their legal equivalents.

What I claim is:

1. A hand truck for transporting longitudinal objects, comprising:
   a flat longitudinal base for supporting objects to be transported, said base having an upper side and a bottom side;
   at least three wheels attached to said bottom side, at least two of said wheels having axes of their rotation fixed with respect to said base, at least one of said wheels being supported on an axle which can swivel in a horizontal plane with respect to said base, all of said wheels being arranged in the same plane which coincides with the longitudinal axis of said base;
   a vertical frame rigidly attached to one side of said base,
   auxiliary ground support means for installing said hand truck in a self-supporting, substantially vertical position, said auxiliary ground support means being pivotally connected to said frame so that it can be turned between said self-supporting position and a folded position;
   first locking means on said frame for locking said auxiliary ground support means in said folded position;
   second locking means for locking said auxiliary ground support means in said self-supporting position; and
   means for fixing an object to be transported onto said hand truck,
   said vertical frame comprising at least two vertical stands interconnected by at least two crossbars, said stands being additionally attached to said base by two side braces which imparts greater rigidity to said frame,
   said auxiliary ground support means comprising a kickstand.

2. The hand truck of claim 1 wherein said kickstand is made in the form of a rectangular frame which has an outer bar and an intermediate crossbar, said first locking means being made in the form of a U-shaped yoke which locks said outer bar in said folded position thereof to said frame, said second locking means being made in the form of a locking arm pivotally attached to said frame at one end and having a hook engageable with said intermediate crossbar at its other end for locking said kickstand in said self-supporting position, said frame supporting a control rod which can be moved with respect to said frame, one end of said control rod being connected to an intermediate position of said locking arm so that when said control rod is pulled up said hook is disengaged from said intermediate cross bar and said kickstand is released and can be turned into said folded position.

3. The hand truck of claim 1 wherein said means for fixing an object to be transported comprises:
   a vertical shoulder formed on the side of said base opposite to said vertical frame, said shoulder being used as a stop for protecting said object against sliding and falling off from said base;
   flexible longitudinally expandable means which can be wrapped around said object, said shoulder having lock receiving means, said flexible means having locking elements on its free ends for engagement with said lock receiving means; and vertically moveable rods slidingly installed on said frame and having hooks on their upper ends which can embrace the upper edge of said object to be transported, so that said hooks ensure additional support for the upper end of said object, said flexible expandable means comprises at least one strap with a quick-release buckle, said locking elements comprise at least one first hook attached to one end said strap, at least one second hook attached to the other end of said strap, said lock receiving means comprise at least one hole formed in said shoulder for receiving said first hook, said second hook being engageable with one of said crossbars of said frame.

4. A hand truck for transporting longitudinal objects, comprising:

a flat longitudinal base for supporting objects to be transported, said base having an upper side and a bottom side;

at least three wheels attached to said bottom side, at least two of said wheels having axes of their rotation fixed with respect to said base, at least one of said wheels being supported on an axle which can swivel in a horizontal plane with respect to said base, all said wheels being arranged in the same plane which coincides with the longitudinal axis of said base;

a vertical frame rigidly attached to one side of said base and formed of a pair of vertical stands interconnected by at least two crossbars, said stands being additionally attached to said base by two side braces which impart greater rigidity to said frame;

a kickstand for installing said hand truck i a self-supporting substantially vertical position, said kickstand being pivotally connected to said frame so that it can be turned between said self-supporting position and a folded position;

first locking means on said frame for locking said auxiliary ground support means in said folded position;

second locking means for locking said auxiliary ground support means in said self-supporting position; and means for fixing an object to be transported onto said hand truck, said kickstand being a rectangular frame which has an outer bar and an intermediate crossbar, said first locking means being a U-shaped yoke which locks said outer bar in said folded position thereof to said frame, while said second locking means is a locking arm pivotally attached to said frame at one end and having a hook engageable with said intermediate crossbar at its other end for locking said kickstand in said self-supporting position, said frame supporting a control rod which can be moved with respect to said frame, one end of said control rod being pivotally connected to an intermediate position of said locking arm so that when said control rod is pulled up, said hook is disengaged from said intermediate cross bar and said kickstand is released and can be turned into said folded position.

5. The hand truck of claim 4 wherein said U-shaped yoke is attached to said outermost crossbar of said frame by a chain.

6. The hand truck of claim 4 wherein said means for fixing objects to be transported comprises:

a vertical shoulder formed on the side of said base opposite to said vertical frame, said shoulder being used as a stop for protecting said object against sliding and falling off from said base;

flexible longitudinally expandable means which can be wrapped around said object, said shoulder having lock receiving means, while said flexible means having locking elements on their free ends for engagement with said lock receiving means; and a plurality of vertically moveable rods slidingly installed on said frame and having hooks on their upper ends which can embrace the upper edge of said object to be transported, so that said hooks ensure additional support for an upper end of said object, said flexible, expandable means comprising at least one strap with a quick-release buckle, said locking elements comprising at least one first hook attached to one end said strap, at least one second hook attached to the other end of said strap, said lock receiving means comprising at least one hole formed in said shoulder for receiving said first hook, said second hook being engageable with one of said crossbars of said frame.

7. The hand truck of claim 6 wherein at least three holes are formed in said shoulder, at least one of said three holes being formed in the center of the length of said shoulder.

8. The hand truck of claim 4 wherein said stands are made from sections of pipe and said vertically moveable rods with respective hooks are slidingly and rotatingly installed inside said pipe sections with said hooks facing upward, each of said pipe sections having at least one groove at its upper end, while each of said vertically moveable rods has a projection corresponding to the shape of said groove, so that when said projection is inserted into said groove, said vertically moveable rod, and hence said respective hook, is fixed against rotation with respect to said pipe sections.

9. The hand truck of claim 8 wherein said stands, said crossbars, and said side braces of said frame are connected to respective elements by welding.

10. The hand truck of claim 8 wherein said base and said frame are made of aluminum alloy.

11. The hand truck of claim 4 wherein the surfaces of said base, said stands, said side braces, and said crossbars which face said object to be transported are padded with a soft resilient material.

12. The hand truck of claim 11 wherein said padding material is rubber.

13. The hand truck of claim 4 wherein said control rod of said second locking means has one end extending upward through a hole of the uppermost of said at least two crossbars of said frame and has a handle on its upper end, two arch-shaped curved portions being formed on said control rod to accommodate said outer bar and said intermediate bar of said kickstand in said folded position.

14. The hand truck of claim 4 wherein in said self-supporting position said vertical frame is inclined to the vertical direction at an angle $\alpha$ which is within the range of 0° to 10°.

15. A hand truck for transporting longitudinal objects, comprising:

a flat longitudinal base for supporting objects to be transported, said base having an upper side and a bottom side;

at least three wheels attached to said bottom side, at least two of said wheels having axes of their rotation fixed with respect to said base, at lest one of said wheels being supported on an axle which can swivel in a horizontal plane with respect to said base, all said wheels being arranged in the same plane which is parallel to the longitudinal axis of said base;

a vertical frame rigidly attached to one side of said base;

auxiliary ground support means for installing said hand truck in a self-supporting substantially vertical position, said auxiliary ground support comprising kickstand which is pivotally connected to said frame so that it can be turned between said self-supporting position and a folded position;

first locking means on said frame for locking said auxiliary ground support means in said folded position;

second locking means for locking said auxiliary ground support means in said self-supporting position; and means for fixing objects to be transported in place on said hand truck.

16. The hand truck of claim 15 wherein said kickstand is made in the form of a rectangular frame which has an outer bar and an intermediate crossbar, said first locking means being made in the form of a U-shaped yoke which locks said outer bar in said folded position thereof to said frame, while said second locking means being made in the form of a locking arm pivotally attached to said frame at one end and having a hook engageable with said intermediate crossbar at its other end for locking said kickstand in said self-supporting position, said frame supporting a control rod which can be moved with respect to said frame, one end of said control rod being connected to an intermediate position of said locking arm so that when said control rod is pulled up said hook is dissenaged from said intermediate cross bar and said kickstand is released and can be turned into said folded position.

17. The hand truck of claim 15 wherein the said means for fixing objects to be transported comprises:

a vertical shoulder formed on the side of said base opposite to said vertical frame, said shoulder being used as a stop for protecting said objects against sliding and falling off from said base;

flexible longitudinally expandable means which can be wrapped around the cargo, said shoulder having lock receiving means, while said flexible means having locking elements on their free ends for engagement with said lock receiving means; and vertically movable rods slidingly installed on said frame and having hooks on their upper ends which can embrace the upper edge of said object to be transported, so that said hooks ensure additional support for the upper end of said object.

18. The hand truck of claim 17 wherein said flexible expandable means comprises at least one strap with a quick-release buckle, said locking elements comprise at least one first hook attached to one end said strap, at least one second hook attached to the other end of said strap, said lock receiving means comprise at least one hole formed in said shoulder for receiving said first hook, said second hook being engageable with one of said crossbars of said frame.

* * * * *